United States Patent [19]

Haider

[11] Patent Number: 5,328,241
[45] Date of Patent: Jul. 12, 1994

[54] SEAT RECLINER PAWL WITH ABBREVIATED TEETH

[75] Inventor: Syed Haider, Northville, Mich.

[73] Assignee: Hoover Universal, Inc., Plymouth, Mich.

[21] Appl. No.: 71,856

[22] Filed: Jun. 7, 1993

[51] Int. Cl.⁵ .............................................. B60N 2/22
[52] U.S. Cl. .................................... 297/367; 297/366; 74/577 M
[58] Field of Search ............................ 297/366–369; 74/575, 576, 577 R, 577 M

[56] References Cited

U.S. PATENT DOCUMENTS

| 84,475 | 12/1868 | Brut et al. | 74/577 M |
| 467,297 | 1/1892 | McLaughlin | 74/577 M |
| 2,245,902 | 6/1941 | Cohn | 74/577 M |
| 4,913,494 | 4/1990 | Ikegaya |  |

Primary Examiner—Peter R. Brown
Attorney, Agent, or Firm—Harness, Dickey & Pierce

[57] ABSTRACT

A recliner for a vehicle seat assembly is disclosed in which the locking pawl of the recliner is formed with teeth configured to resist damage when the seat back is rotated to a forward dump position. The pawl teeth at the end of the pawl closest to the slide face of the recliner latch gear are of a shorter length than the remainder of the pawl teeth to enable the teeth to resist bending deformation caused by impact with the latch gear end face. The pawl teeth are of a progressively longer length from the end of the pawl inward, over a limited number of teeth.

6 Claims, 2 Drawing Sheets

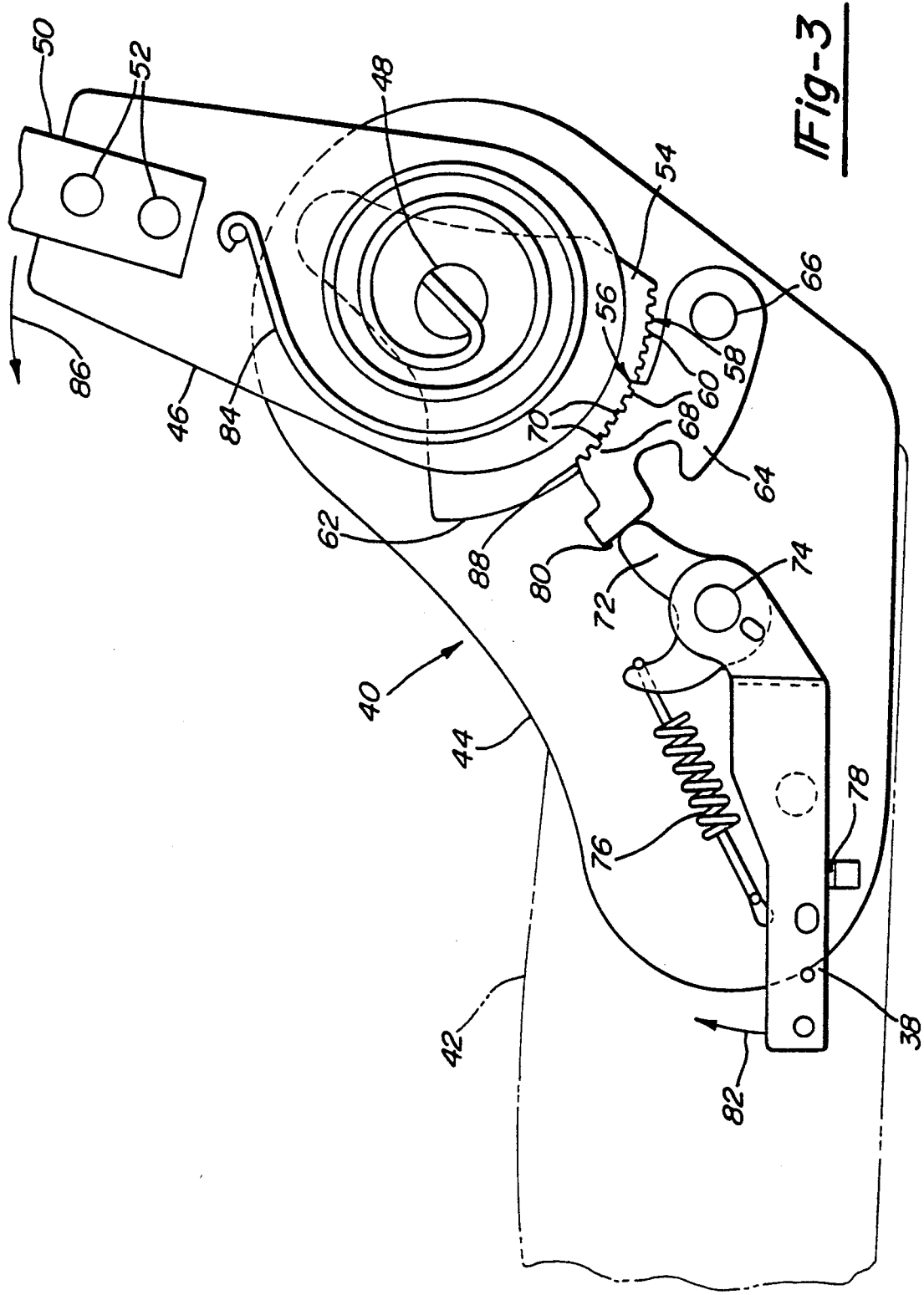

SEAT RECLINER PAWL WITH ABBREVIATED TEETH

BACKGROUND AND SUMMARY OF THE INVENTION

The present invention relates to a recliner for a vehicle seat assembly of the type having a locking pawl with teeth engaging a toothed sector of a latch gear to hold the seat back in place. More particularly, the invention pertains to the profile of a portion of the pawl teeth.

In two door vehicles, it is typical for the seat back of a front seat assembly to be rotatable forward to a "dump" position. This facilitates ingress and egress to and from the rear seat of the vehicle. The seat back is dumped forward by releasing the recliner mechanism and allowing a biasing spring to rotate the seat back forward. Reclining mechanisms of the type described above, when used in seat assemblies with a dump feature, have a latch gear that includes a radially raised slide face at one end of the toothed sector. When the seat back is in the forward dump position, the slide face of the latch gear confronts the teeth of the locking pawl. Since the slide face is smooth, there is no interlocking between the pawl and the latch gear. This allows the seat back to be returned to an upright position without again having to actuate the recliner mechanism.

One problem with such a recliner mechanism is described with reference to FIG. 1. The latch gear 10 is typically attached to the seat back frame for rotation about the pivot 12. The latch gear 10 includes a toothed sector 14 with a plurality of teeth 16 concentric about the pivot 12. At one end of the toothed sector 16, a slide face 18 is radially raised from the toothed sector. An end face 20 extends between the toothed sector and the slide face 18. The locking pawl 22 is mounted to the seat lower frame for rotation about the pivot 24. Pawl 22 includes a toothed portion 26 having a plurality of teeth 28 complementary to and engagable with the teeth 16 of the latch gear.

When the seat back is dumped forward as shown by the arrow 30, the slide face 18 will move into a position confronting the pawl teeth 26 whereby the recliner mechanism is inoperable to lock the seat back in place. When the seat back is returned to an upright position and the slide face 18 moves beyond the pawl teeth 28, the pawl teeth will once again re-engage with the latch gear teeth and lock the seat back in place.

When the pawl is released to "dump" the seat back, if the pawl 28 is not moved sufficiently away from the latch gear, the corner of the latch gear end face will impact against the end tooth 28 of the locking pawl. This impact can deform the end tooth 28 moving it out of position with respect to the other teeth. This deformation can prevent all of the pawl teeth from properly engaging the latch gear teeth 16. The result is incomplete locking of the seat back.

In a four door vehicle, the seat back may move forward such that the sector "over travels" beyond its lock position creating a similar condition where the sector impacts the pawl teeth and causes deformation of the pawl teeth.

Accordingly, it is an object of the present invention to provide a pawl and latch gear with a tooth profile to minimize or eliminate damage to the pawl teeth caused by impact with the latch gear end face.

The primary focus of attempts to overcome this problem has been the profile of the end face 20. The typical approach has been to form the corner of the end face at an incline relative to the radius of the latch gear to reduce the amount of deformation of the locking pawl teeth. The focus of the present invention however, is directed toward the pawl teeth and provides pawl teeth that are configured to minimize damage caused by impact with the latch gear end face.

A portion of the pawl teeth, at the end of the pawl closest to the slide face, are truncated in height. This results in teeth that are shorter and therefore wider at their distal ends. The shorter height both reduces the likelihood of impact with the latch gear end face and increases the strength of the teeth to resist deformation caused by impact. The end most tooth is the shortest with the teeth gradually increasing in length over the first few teeth of the pawl.

Further objects, features and advantages of the invention will become apparent from a consideration of the following description and the appended claims when taken in connection with the accompanying drawings.

BRIEF DESCRIPTION OF THE DRAWINGS

FIG. 3 is a side elevational view of the recliner mechanism of the present invention.

DETAILED DESCRIPTION OF THE INVENTION

Figure 1:
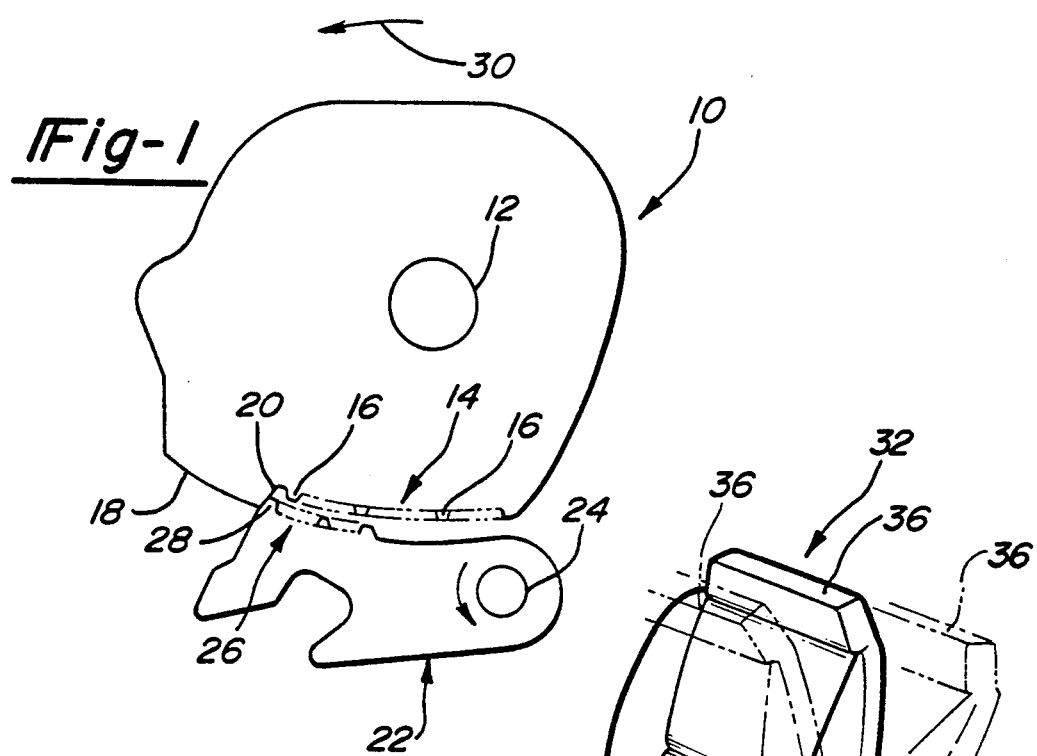
FIG. 1 is a elevational view of a typical recliner latch gear and locking pawl illustrating the problem overcome by the present invention.
Figure 2:
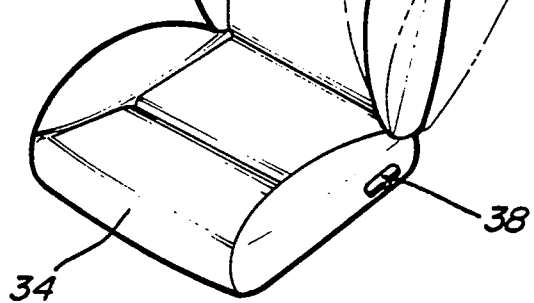
FIG. 2 is a perspective view of a seat assembly incorporating the recliner of the present invention.

Seat assembly 32 shown in FIG. 2 contains the recliner of the present invention. Seat assembly 32 is of conventional structure for a vehicle seat assembly and includes a generally horizontal lower seat cushion 34 and a generally upright seat back 36 extending upwardly at the rear of the seat cushion 34. The seat back 36 is pivotally mounted to the seat cushion for the purpose of adjusting the angle of inclination of the seat back. The seat back can be reclined from the upright position shown in solid line to a rearwardly reclined position shown in broken line by operation of the recliner 40 through its operating lever 38 at the side of the seat cushion. For use in a two-door vehicle, the recliner also provides for forward rotation of the seat back from its upright position to a forwardly rotated dump position also shown in broken line. This improves the ease of access to the rear seat area of the two-door vehicle into which the seat assembly is installed.

The recliner 40 is shown in greater detail in FIG. 3 in connection with the seat cushion and seat back. The recliner 40 generally serves as a hinge for mounting the seat back and provides a locking mechanism for holding the seat back in a selected rotational position. A seat cushion frame for the seat cushion 34 is mounted to a riser 42 that is a part of the seat assembly lower frame. The recliner includes a fixed first plate 44 which is secured to the riser 42 by rivets, bolts, welding, etc. A rotating second plate 46 is pivotally attached to the fixed plate 44 for rotation about the pivot pin 48. A back frame for the seat back 36 includes an arm 50 that is secured to the rotating plate 46 by fasteners 52.

While the recliner is shown and described as comprising a pair of plates 44 and 46, it is not uncommon for the fixed plate 44 to be constructed of a pair of spaced plates with the rotating plate 46 disposed therebetween. The structure shown is only intended to represent a typical recliner structure and not to limit the scope of the present invention.

A latch gear 54 is attached to the rotating plate 46 and includes an edge 56 that is concentric about the pivot pin 48. The edge 56 includes a toothed sector 58 having a plurality of teeth 60 and a radially raised slide face 62 also concentric about the pivot pin 48.

A pawl 64 is rotatably mounted to the fixed first plate 44 for rotation about a pivot pin 66 generally parallel to the pivot pin 48. The pawl 64 includes a toothed portion 68 having an array of teeth 70 formed in a concave peripheral edge surface. The toothed portion has a radius substantially equal to the radius of the toothed sector 58 of the latch gear 54 to allow the pawl teeth to mesh with the latch gear teeth. When the pawl 64 is in a locked position, the pawl teeth 70 engage the latch gear teeth 60 and lock the seat back in position. The pawl is held in the locked position by a cam 72 coupled to the recliner operating lever 38. The operating lever 38 is also pivotally mounted to the fixed plate 44 by a pivot pin 74. A bias spring 76 acts to hold the operating lever 38 in a counterclockwise rotated position against a stop 78. In this position, the cam 72 contacts an edge surface 80 of the pawl opposite the toothed portion 68. This operates to hold the pawl in the locked position with the teeth 70 of the pawl engaging the teeth 60 of the latch gear 54.

Release of the recliner 40 by clockwise rotation of the operating lever, as shown by the arrow 82, operates to disengage the cam 72 from the surface 80 of the pawl allowing the pawl teeth 70 to disengage from the latch gear teeth 60. This frees the seat back 36 for rotation. A spiral bias spring 84 coupled to the rotating plate 46 and the pivot pin 48 operates to urge the seat back to rotate forward as shown by the arrow 86 when the recliner is released. When the seat back has rotated forward to the dump position, the slide face 62 is in confronting juxtaposition with the teeth 70 of the pawl 64. This prevents the recliner 40 from locking, enabling the seat back to be returned to an upright operative position without the necessity of again actuating the recliner.

When the seat back is rotated forward to the dump position, if the pawl 64 has not been rotated sufficiently away from the latch gear, the end face 88 that extends between the teeth 60 of the latch gear and the slide face 62 will contact the end tooth 70 of the pawl. This impact between the end face and the pawl teeth can damage the end tooth of the pawl, primarily by bending the distal end of the tooth. This bending can ultimately prevent the pawl teeth from fully engaging with the latch gear teeth and thereby prevent full locking of the seat back.

Figure 4:
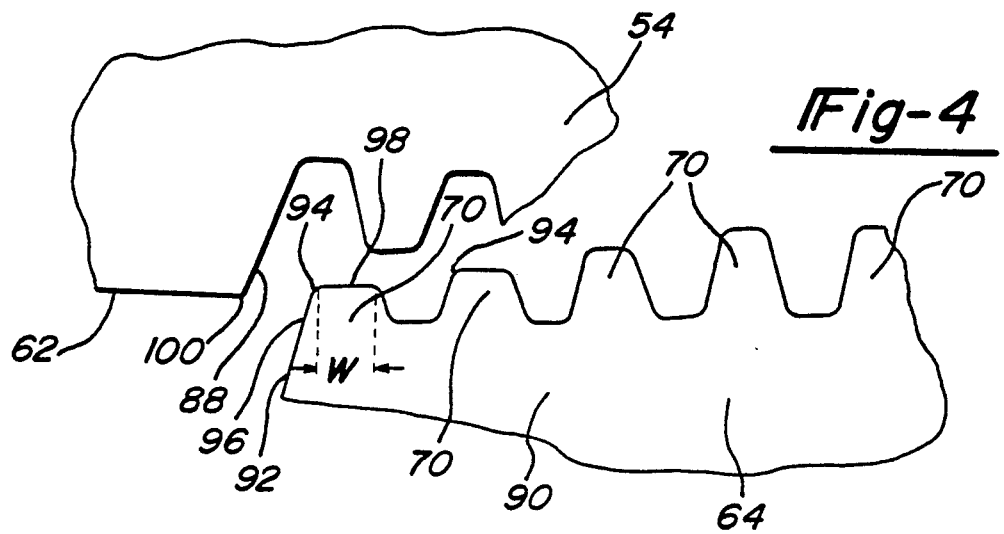
FIG. 4 is an enlarged elevational view of the locking pawl teeth and the latch gear showing the teeth profile of the present invention.

With reference to FIG. 4, the pawl and the latch gear are shown in an enlarged view to illustrate the teeth 70 of the pawl. Three teeth 70, at the end of the pawl closest to the slide face 62, are truncated in height relative to the remainder of the teeth 70. As a result, the distal ends of these three teeth do not project as far from the main body portion 90 of the pawl 64. The width W of the end most tooth 70, at its distal end, is thus greater than the width of the teeth 70 of normal length at their distal ends. The truncated teeth are thus stronger at their distal ends to resist bending deflection. When the end tooth is impacted by the end face 88 of the latch gear, it is less prone to bending damage.

The three truncated teeth are of increasing length from the pawl end 92 inward. By providing the three end teeth of gradually increasing length, the first tooth will receive the greatest impact from the latch gear end face. Each successive tooth will receive a lesser impact so that when the end face reaches the fourth tooth, which is of normal length, the impact will not be of sufficient force to damage the tooth. By gradually increasing the length of the pawl teeth 70, the teeth are better able to resist damage from the latch gear, ensuring that the pawl and latch gear teeth will properly engage.

While the invention has been described in the context of a seat assembly for a two door vehicle, the recliner pawl has utility in a seat assembly without a dump feature. In a recliner for four door vehicles, without a dump feature, the sector gear terminates with an end face and a raised face similar to the slide face described above. Over travel of the sector gear can result in an impact of the sector gear end face and the pawl teeth. The pawl of the present invention, with abbreviated teeth will reduce damage done to the pawl teeth by impact with the sector gear end face.

The present invention is not limited to the exact construction shown. For instance, the profile of the teeth 60 and 70 can be other than what is shown. The invention pertains to the stepped or non-stepped increase in pawl tooth length over any number of teeth beginning with the pawl end closest to the latch gear slide face. Any tooth profile can be used with the teeth closest to the slide face being truncated in height.

It is to be understood that the invention is not limited to the exact construction illustrated and described above, but that various changes and modifications may be made without departing from the spirit and scope of the invention as defined in the following claims.

I claim:

1. A locking pawl for a vehicle seat assembly recliner for locking engagement with a moving member having a plurality of teeth and being movable relative to said pawl, said pawl comprising:
   a generally planar body;
   means for mounting said body for rotation about an axis generally normal to the plane of said body;
   a peripheral edge portion of said planar body having an array of pawl teeth having engagement surfaces which are all commonly engagable with said teeth of said moving member to hold said moving member in place, a portion of said pawl teeth, at one end of said array, having the engagement surfaces of a shorter height than the engagement surfaces of the remainder of said teeth.

2. The pawl of claim 1 wherein the end tooth at said one end of said array is the shortest tooth with the pawl teeth progressively increasing in height from said end tooth.

3. A recliner for a vehicle seat assembly, the seat assembly including a lower seat cushion and a seat back pivotally mounted to the seat cushion for rotation about a first pivot axis, said recliner comprising:
   a latch gear attached to one of said seat cushion and seat back, said latch gear having a toothed sector with a plurality of latch gear teeth arranged concentric about said first pivot axis, a radially raised face at one end said toothed sector and an end face extending between said toothed sector and said raised face;

a pawl pivotally mounted to the other of said seat cushion and seat back for rotation about a second pivot axis parallel to said first pivot axis, said pawl having a toothed portion with pawl teeth engagable with the latch gear teeth, said pawl being movable between a latch position in which said pawl teeth engage said latch gear teeth and a release position in which said pawl teeth are disengaged from said latch gear teeth, a portion of said pawl teeth positioned closest to said raised face being of a shorter height than the remainder of said pawl teeth whereby said shorter pawl teeth are better able to withstand impacts from said end face of said latch gear without damage.

4. The recliner of claim 3 wherein the end pawl tooth closest to said raised face is the shortest tooth with the pawl teeth progressively increasing in height from said end tooth.

5. A recliner for a vehicle seat assembly in which the seat assembly includes a lower frame, a lower seat cushion mounted to said lower frame and a seat back extending upwardly at the rear of the seat cushion, said seat back including a back frame pivotally mounted to said lower frame, said seat back being rotatable to plural reclined positions and to a forward dump position, said recliner comprising:

a first plate means fixed to the lower frame;

a second plate means fixed to the back frame and pivotally mounted to said first plate means for rotation about a first pivot axis whereby the back frame is pivotally mounted to the lower frame;

a latch gear attached to one of the lower and back frames, said latch gear having a toothed sector with a plurality of latch gear teeth arranged concentric about said first pivot axis, a radially raised slide face at one end of said toothed sector concentric about said first pivot axis and an end face extending between said toothed sector and said slide face;

a pawl pivotally mounted to the other of said lower and back frames for rotation about a second pivot axis parallel to said first pivot axis, said pawl having a toothed portion with pawl teeth engagable with said latch gear teeth, and said pawl being movable between a latch position in which said pawl teeth engage said latch gear teeth to hold said back frame in a reclined position and a release position in which said back frame is free to rotate to said forward dump position in which said slide face is in confronting juxtaposition with said pawl teeth;

bias means for rotating said back frame forward when said pawl is in said release position whereby said slide face is moved into confronting juxtaposition with said pawl teeth; and a portion of said pawl teeth closest to said slide face being of a shorter height than the remainder of said pawl teeth whereby said shorter pawl teeth are better able to withstand impacts from said end face upon rotation of said back frame to said dump position.

6. The recliner of claim 5 wherein the end tooth of said pawl closest to said slide face is the shortest with said pawl teeth progressively increasing in length from said end tooth.

* * * * *